United States Patent Office 3,439,559
Patented Apr. 22, 1969

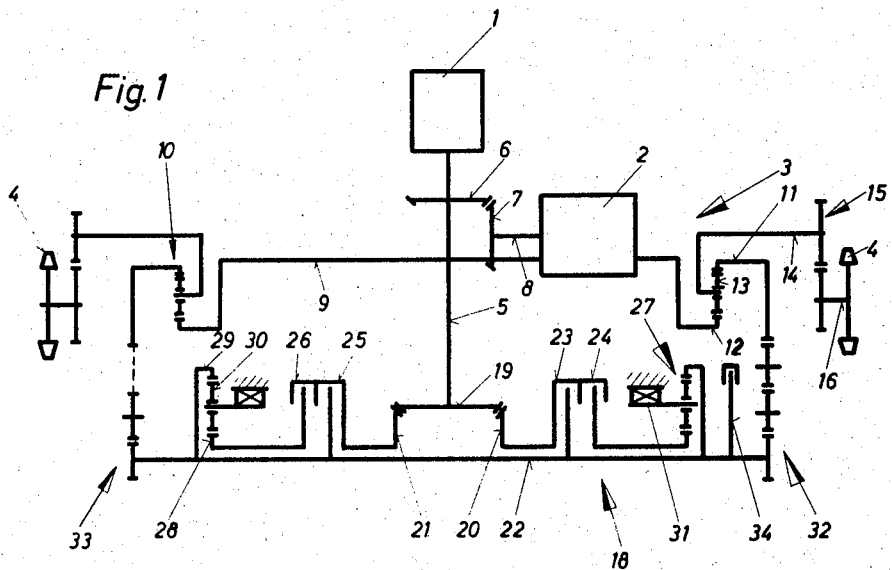
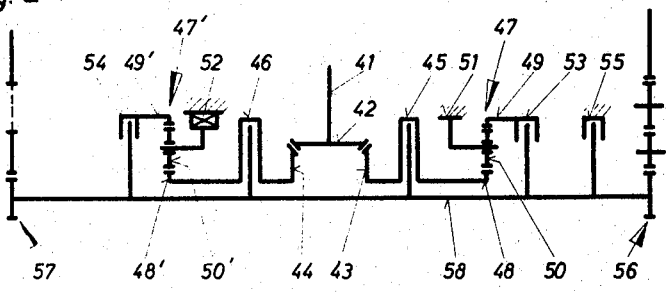
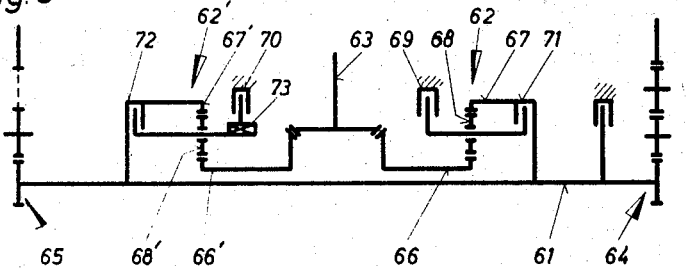

3,439,559
SUPERIMPOSED STEERING GEAR FOR TRACKED VEHICLES
Bernhard Binger, Ravensburg, and Karlheinz Duernay, Friedrichshafen, Germany, assignors to Zahnradfabrik Friedrichshafen Aktiengesellschaft, Friedrichshafen, Germany
Filed May 24, 1966, Ser. No. 552,500
Claims priority, application Germany, June 30, 1965, Z 11,623
Int. Cl. F16h 37/06
U.S. Cl. 74—720.5                                     24 Claims

ABSTRACT OF THE DISCLOSURE

An engine-driven change speed gear mechanism drives a pair of track-laying wheels through a pair of summation gear devices to propel a vehicle without turning when the control elements of the gear devices are held stationary. Steering of the vehicle is effected by superimposed drive of the control elements in opposite directions through a steering gear assembly driven by the engine having drive ratio control means to change the rotational speed of the control elements and the turning rate of the vehicle in either direction.

---

Figure 4:
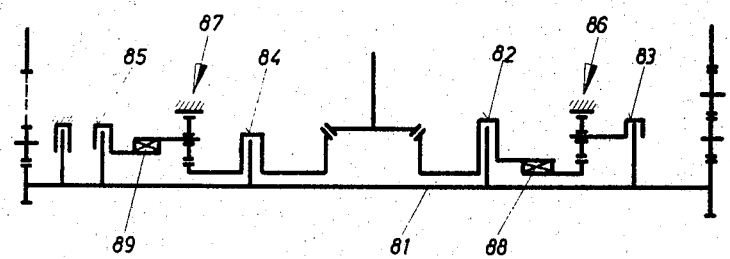

This invention relates to tractor type vehicles having side tracks which are power-driven in unison for straight ahead driving and wherein one track is driven faster than the other to effect steering.

The present invention utilizes superimposed gearing wherein the engine of the tractor drives two gear systems, one of which effects drive and the other of which effects steering drive by being coupled or superimposed through a summation or combining gear drive arrangement to the shafts which drive the individual tracks.

In brief, the combining of the steering drive and the tractor drive for each track is effected in a planetary gear device wherein a planet carrier is coupled to the drive shaft for each of the tracks, there being identical planet gear summation or combining gear drives for each track. In each instance, such summation drive involves a planetary gear device coupled to driving power with steering control coupled to such device so as to change the output speed coupled therefrom to the respective side tracks, for one rate of steering, at a relatively large radius.

Accordingly, it will be understood that each track of the vehicle is provided with a summation drive in the form of a planetary gear device in which vehicle drive power for operating the tracks is coupled, e.g., to the orbit gears and wherein steering control is effected by rotation of the sun gears in opposite directions. It will thus be appreciated that a relative difference in rotation of the sun gears will change the speed of the side tracks relative to each other causing the tractor to turn, that is, to steer.

In order to provide steering drive of the planetary gearing mentioned above, the tractor engine is selectively coupled through clutches to respective reduction gearing for left and right steering. Such gearing, planetary devices, drives a common so-called steering shaft for left or right steering on the large radius, which shaft carries the sun gears for the planetary devices just mentioned. The steering direction is determined by the direction of rotation of the shaft effected by driving the last mentioned planetary devices by one or the other of a pair of bevel pinions disposed on opposite sides of a steering drive bevel gear in conjunction with a reverse gear idler which is part of one of the gear reduction trains coupling the summation devices with the steering shaft.

The steering shaft can be engine-driven through the bevel gearing for effecting a small radius of steering, either left or right, via selective clutch control.

In order to effect straight ahead drive the steering shaft is held stationary by a stabilizing brake.

The arrangement generally described above effects a compact and relatively simple arrangement by virtue of the symmetry of the several planetary gearing devices, the clutches, and bevel gears, wherein a single and simple steering shaft crosswise of the vehicle for steering control is utilized. Further, a reduction in the number of gears required to produce steering at two different rates is minimized. Still further, by the use of friction type clutches which can be operated hydraulically, mechanically or electro-mechanically, a certain amount of control of slippage can be effected in order to produce steering rates intermediate the two fixed rates provided by the gears. Further, the steering power provided to the summation drive gearing is furnished by the engine and is, therefore, not dependent on the gear shift mechanism otherwise used to control tractor speed.

In addition to the simplicity of construction a reduction of cost is effected by the symmetry of the gearing and smaller gears for effecting steering control can be used because the torque furnished thereby is very small, the forces involved being smaller than those found in prior art superimposed steering gear arrangements.

Thus, the objects of the invention will be apparent from the foregoing: to effect simplicity, compactness, and cost of reduction; and other objects and features will be apparent from the description to follow.

In the drawing FIG. 1 shows an arrangement in accordance with one form of superimposed steering system.

FIGS. 2 through 7 show variations of such systems.

Referring to FIG. 1, an engine 1 drives, via bevel gears 6 and 7 and input shaft 8, a gear shift mechanism 2 which is coupled via common output shaft 9 to the orbit gears 12 of a pair of summation drives or combining gear planetary devices, such as 10. The reference numeral 3 designates the main drive for the tracks as occurring through the planetary gear devices 10 which will be understood to be identical and to be disposed adjacent each track. Each of the drives 10 provides tractive power via planet carriers 13 through shafts 14 to suitable gearing 15 at each side of the vehicle and thence to the track propelling wheels 4. The sun wheels 11 will be understood to be held stationary for straight ahead driving in a manner to be disclosed.

A steering control gearing and clutch arrangement is designated generally by reference numeral 18 and comprises a steering shaft 22 extending transversely of the vehicle, which is coupled at each end to suitable constant mesh, reduction gearing trains 32 and 33 for respective tracks, such reduction gearing coupled to the respective sun gears 11, and one such train having an idler to effect reversal of rotational output with respect to the other.

From the above, it will be understood that if steering shaft 22 is rotated in either direction, it will cause opposite rotational movement of the sun gears 11 via gear trains 32 and 33 to effect a difference in speeds of the shafts 14 whence the tracks will be driven at different speeds causing the vehicle to steer in one direction or the other depending upon the direction of rotation of shaft 22.

In order to effect control of the direction of rotation of shaft 22 and also the rate of rotation, a power take-off shaft 5 brings rotational power from the engine to a bevel gear 19 and thence to side bevel gears 20 and 21 which rotate the housings of clutches 23 and 24 via bevel gear 20 and the housings of clutches 25 and 26 via the bevel gear 21. The clutch 24 powers a planetary gear set 27 while the clutch 26 powers an identical planetary gear set, as will be apparent from the drawing. In each instance, the planetary gear arrangement 27 comprises a sun gear 28, planet carrier 30 and orbit gear 29. The sun gears support the gear sets 27 on shaft 22. Thus, power can be transmitted in each instance to the sun gears 28 via respective clutches 24 and 26 and power from each of these planetary steering gear devices is coupled via orbit gears 29 to shaft 22. The planet carries 30 are fixed to ground via overrunning brakes 31, respectively.

Accordingly, if either clutch 24 or 26 is closed by any suitable conventional control means, the respective planetary gearing 27 is coupled to power via the bevel gears 19, and 20 or 21, whence the respective sun gear 28 will be caused to rotate, it being understood that the respective planet carrier 30 is held non-rotatively by the respective one-way brake 31 at this time.

For example, if clutch 26 be closed, shaft 22 will be rotated in a particular direction via bevel gear 21, through clutch 26, and through the planetary device 27 at the left, such rotation being dependent is direction on the direction of rotation of bevel gear 21 and at a rate dependent upon the ratio of the planetary gearing 27. In a similar manner opposite directional rotation of shaft 22 is effected by engaging clutch 24 but the rate of rotation will remain the same since the planetary gear devices 27 are identical. Accordingly, steering of the vehicle will be effected on a relatively large radius because of the rotational speed reduction effect of planetary devices 27 on the rate of rotation of sun gears 11. The greater gear reduction effected by the planetary devices 27, the greater the radius of turn since the relative ultimate speeds of shafts 14 become less as the rotational rates of the sun gears 11 are diminished, up to the point where if sun gears 11 are held fixed, straight ahead driving will result. Such result is accomplished by providing a brake 34 for the shaft 22, the brake being applied under operator control when all clutches are released, or any automatic brake control responsive to release of all clutches can be used.

For a small radius of turn, either left or right, the clutches 23 or 25 are engaged. This results is driving shaft 22 in one direction or the other via respective bevel gears 20 or 21 but at a fairly high rate of speed thereby causing opposite rotation of sun gears 11 at a relatively great rate to effect a consequent large differential of speeds of shafts 14 at commensurate rate.

The free wheeling brakes 31 prevent overlap of power flow in shifting from a larger to a smaller steering radius. In other words, if either of the planetary steering devices 27 is rotated at the time of shift, no harm will be done by suddenly rotating shaft 22 at a greater rate, via the bevel gears 20 or 21, even though there be some lag in clutch action, since such planetary devices will simply then lose reaction support for providing rotative power.

By providing operator control of clutch slippage it will be apparent that infinite variation of turn radius can be effected between infinity established when brake 34 is engaged and a minimum radius established through clutch 23 or 25.

The modifications of the invention shown in FIGS. 2 through 7 relate only to changes in the planetary gearing for effecting the speed of the steering shaft, such as the steering shaft 22 of FIG. 1. In each modification a brake such as brake 34 of FIG. 1 is utilized on the steering shaft, this brake being indicated at 55 in FIG. 2, but no reference character therefor being required in FIGS. 3-7 since its presence and function is now understood.

Specifically, in FIG. 2, the steering shaft 58 effects rotation at each end for reduction gear trains 56 and 57, the equivalent of gearing 32 and 33 of FIG. 1. The planetary devices 47 and 47', the equivalent of devices 27 of FIG. 1, provide a respective direction of rotation for shaft 58 at a respective but equal rates for large turning radius. Drive shaft 41 acting through bevel gear 42 rotates side bevel gears 43 and 44 to rotate clutch housings 45 and 46, respectively, in opposite directions. Accordingly, it will be apparent that for small turning radius either the clutch 45' or 46 is engaged by conventional control means or actuators to produce left or right steering depending on direction of rotation, all as heretofore described for clutches 23 and 25 of FIG. 1.

Sun gears 48 and 48' support their respective planetary gear sets on steering shaft 58.

Clutch housing 45 rotates the sun gear 48 for the planetary gearing 47 and the carrier for planets 50 is fixed to the gearing housing 51. In a similar manner, clutch housing 46 rotates sun gear 48' of planetary gearing 47', the carrier for planet gears 50' being secured to the gearing housing via a free wheeling brake 52. The orbit gears 49, 49' are connected via respective clutches 53 and 54 to the steering shaft 58. As previously mentioned, a brake 55 is utilized for straight ahead travel which has the effect of stabilizing the summation drives 10 which will be understood to be coupled to the respective reduction gearings 56 and 57.

The operation of FIG. 2 will be apparent from the system illustrated and from the explanation given for FIG. 1. In this instance, however, only one free wheeling brake is needed because of the rotational separation of the clutch housing 46 from 54 and the separation of clutch housing 45 from 53, whereby a single free wheeling brake is effective to prevent overlapping of power flow in shifting from large to small steering radius.

In the form of the invention shown in FIG. 3, two steering control planetary gear sets 62 and 62' are supported on the steering shaft 61 by their sun gears 66 and 66'. Rotation of shaft 61 will effect opposite directional rotation, via respective gear trains 64 and 65, of the sun gears for the summation drives such as 10 of FIG. 1. Power is through engine shaft 63 via bevel gears. as shown, to sun gears 66 and 66'. The carriers of planet gears 68 and 68' have brakes 69 and 70, respectively, and clutches 71 and 72, respectively. Clutches 71 and 72 connect the carriers with respective orbit gears 67 and 67'. The orbit gears are keyed to steering shaft 61. The arrangement is such that the orbit gears are driven by a respective sun gear when a respective brake is engaged. Accordingly, a large turning radius is effected via planetary gear sets 62 and 62' for steering in one direction or the other depending on whether brake 69 or 70 is engaged. To effect steering on a smaller turning radius, clutches 71 and 72 lock the respective orbit gears and planet carriers of the respective planetary gear sets so that either set can rotate as a block. In that case power is transmitted directly through the respective side bevel gear and the locked planetary gear set to shaft 61 in a direction depending upon which clutch is engaged. A free wheeling brake 73 is intermediate the planetary carrier for planetary gear set 62' and brake 70 so that opening of clutch 72, when shifting from large to small steering radius, will not be required and, accordingly, no interruption of steering power flow occurs.

In the form of the invention shown in FIG. 4 two planetary gear sets 86 and 87 are carried via their sun gears on steering shaft 81 and clutches 82 and 84 can connect the side bevel gears to shaft 81 while clutches 83 and 85 can connect the respective planet carriers to shaft 81. A free wheeling clutch 88 is intermediate the sun gear of planetary gear set 86 and clutch 82 while the free wheeling clutch 89 is intermediate the carrier of planetary gear set 87 and clutch 85. Accordingly, by engagement of clutch 83 or 85 large turning radius is effected via the respective planetary gear set and overlapping of power flow when shifting to a smaller steering radius and upon engagement of clutches 82 or 84 is prevented by the respective free wheeling clutches 88 and 89. The orbit gears for the planetary gear sets are fixed to the housing for this modification.

Figure 5:
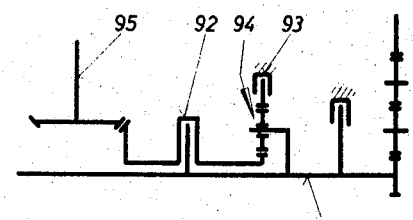

In the form of the invention shown in FIG. 5 the orbit gear of the planetary gear set 94 is selectively controlled so as to be held stationary by a brake 93. In such case the steering shaft 91 will be rotated by the planetary carrier for large radius steering. A clutch 92 has a housing which couples a side bevel gear driven by shaft 95 to the sun gear carried on shaft 91. The driven component of the clutch, when the clutch is engaged, couples the side bevel gear to steering shaft 91 for small radius steering. It will be understood that the same components are duplicated for the opposite side of shaft 91.

Figure 6:
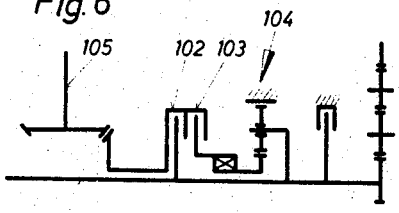

In the form of the invention shown in FIG. 6, a twin clutch comprising clutches 102 and 103 is arranged so that clutch 102 can effect direct drive via the bevel gearing from drive shaft 105 to steering shaft 101. The clutch 103 can effect drive via free wheeling clutch 106 to the sun gear of planetary gear set 104. The orbit gear is fixed. The planetary carrier is keyed to rotate shaft 101. The other side of shaft 101 is provided with identical components as just described. This modification is very similar to the arrangement shown in FIG. 1 except that the steering shaft is driven by the planetary carriers, whereas in FIG. 1 it is driven by the orbit gears.

Figure 7:
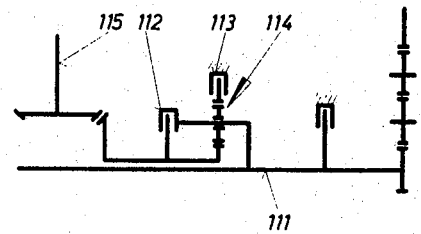

In FIG. 7, the arrangement is such that the drive shaft 115 acting through the bevel gearing rotates the sun gear of planetary gear set 114, the sun gear being mounted on steering shaft 111 and the orbit gear being engageable to be held stationary by a brake 113. When the brake is engaged, the carrier drives shaft 111 for a large steering radius. Clutch 112, when engaged, directly couples drive shaft 115 with steering shaft 111 for steering on a small radius. It will be understood that in such direct coupling of the driving shaft 115 with the steering shaft 111, the planet carrier is a coupling component and is locked to the sun gear so that the planetary gear device rotates as a block.

In all of the modifications heretofore described it will be understood that simultaneous or substantially simultaneous release and engagement coaction of clutches and brakes, and vice versa, can be effected manually or by automatic means and that engagement of the stabilizing brake of each modification, such as brake 34 of FIG. 1, can likewise be automatically responsive to a particular condition of open or engaged clutches and brakes, dependent upon the particular arrangement used as described in the several modifications.

From the foregoing it will be apparent that a very compact mechanism is possible by the use of the teaching of the invention and one which, by virtue of the use of identical components for each track, can reduce cost. Further, since the actual steering force required is not transmitted through the steering shafts, the gearing for driving such shafts can be small, all commensurate with the general objects of the invention as heretofore mentioned.

Finally, the simplicity of providing a single transverse steering shaft and the advantages of such an arrangement will now be evident. Finally, the rate of turn in steering is not dependent upon a particular gear selection for the vehicle gear shift transmission which drives the tracks and is, therefore made largely independent of the speed of the vehicle.

What is claimed is:

1. A superimposed steering gear for tracked vehicles comprising a steering shaft 22 and a pair of steering control planetary gear sets 27 having elements 29 connected to the steering shaft for alternate drive thereof in opposite directions, steering control drive means 19, 20, 21 for said gear sets, operator control means 24, 26 to selectively connect said steering control drive means to said steering control gear sets to effect a selected direction of rotation of the steering shaft, a pair of planetary summation drive gear sets 10 each having an input element 12 and a component 11 drivingly connected to said steering shaft, means 32 drivingly connecting the steering shaft to said components of the summation gear sets for drive of said components in opposite directions at the same time, and means 14 for driving the tracks of said vehicle through said summation gear sets as a function of the relative rotation of the input element and the component in each of the summation gear sets, whereby rotation of said steering shaft 22 by one of said steering control planetary gear sets 27 in a selected direction effects a difference in rotational output speeds of said summation drive gear sets to effect steering selectively left or right at the predetermined turning rate.

2. A steering gear as set forth in claim 1, including opeartor control means to directly and selectively connect said steering control drive means to said steering control shaft for effecting selected direction of rotation for steering at another turning rate.

3. A steering gear as set forth in claim 2, wherein said steering control planetary gear sets are identical and said steering control drive means are identical, and said sets and drive means are symmetrically arranged relative to said steering shaft, said sets having sun gears rotative on said shaft and supported thereby.

4. A steering gear as set forth in cliam 2, both said operator control means comprising clutches wherein said steering shaft has driven clutch components thereon, said steering control drive means having respective driving clutch components connected theerto for opposite rotation, to effect direct drive of said driven clutch components to rotate said steering shaft in counter-rotating directions, planet carriers of said steering control planetary gear sets having respective clutch driving components connected thereto having respective driven clutch elements connected to said steering shaft, the driving clutch components connected to said steering control drive means being connected to respective sun gears of said steering control planetary gear sets, the connection between one said planet carrier and the respective clutch driving component being through a freewheeling clutch and the connection between the other clutch driving component and the respective sun gear being through a freewheeling clutch, each of said sets having a fixed orbit gear.

5. A steering gear as set forth in claim 1, including brake means to hold said steering shaft stationary for straight ahead driving.

6. A steering gear as set forth in claim 1, wherein said means to selectively connect said steering control drive means to said steering control planetary gear sets comprises clutch means.

7. A steering gear as set forth in claim 1, wherein said means to selectively connect said steering control drive means to said steering control planetary gear sets comprises clutch means.

8. A steering gear as set forth in claim 1, wherein said steering control drive means comprises a bevel gear and a pair of bevel pinions engaged therewith at opposite sides thereof, and selectively operable clutch means for connecting respective bevel pinions to respective planetary gear sets.

9. A steering gear as set forth in claim 8, including freewheeling brake means connected between the carriers of said steering control planetary gear sets and a fixed frame to prevent overlapping of power flow when changing steering rate.

10. A steering gear as set forth in claim 8, including additional clutch means selectively operable for connecting respective bevel pinions to respective steering control planetary gear sets.

11. A steering gear as set forth in claim 1, said steering control planetary gear sets having respective sun gears carried on said steering shaft.

12. A steering gear as set forth in claim 1, one of said steering control planetary gear sets having a planet carrier secured to a fixed frame whereby said carrier remains stationary, and the other of said steering control planetary gear sets having a carrier secured to a fixed frame through a freewheeling brake.

13. A steering gear as set forth in claim 1, each of said steering control planetary gear sets having a sun gear connected to be oppositely rotated by said steering control drive means, said operator control means comprising clutches connected to respective steering control planetary gear sets to selectively effect rotation in block thereof, said clutches being operable to connect said sets to said steering shaft when said sets are rotating in block, said operator control means further comprising brakes for respective sets to selectively effect planetary action, said elements of said sets being connected to said steering shaft for drive thereof.

14. In a steering gear as set forth in claim 13, said steering control drive means comprising counter-rotating elements being connected to rotate a driving component of a respective clutch, and driven components of said clutches being secured to said steering shaft, said driven components being connected for power flow through respective steering control planetary gear sets.

15. A steering gear as set forth in claim 1, including an engine connected to effect direct drive of said steering control drive means and said steering control drive means comprising a bevel gear driven by said engine and a pair of oppositely rotating bevel pinions for driving said steering control planetary gear sets.

16. A steering gear as set forth in claim 1, said steering control drive means comprising a pair of oppositely rotating elements, a clutch intermediate each of said elements and said steering shaft for effecting direct drive from said steering control drive means in opposite rotational directions, each said clutch having a driving component connected to a sun gear of a respective steering control planetary gear set, a planet carrier of each said set being connected to said steering shaft and respective brakes for orbit gears of said sets.

17. A steering gear as set forth in claim 1, said steering control drive means comprising a pair of oppositely rotating members, a respective twin clutch having a driving component connected to each said member, a driven component of each twin clutch being connected to said steering shaft, another driven component of each twin clutch being connected through a freewheeling clutch to a sun gear of a respective steering control planetary gear set, a carrier of each said set being connected to said steering shaft and an orbit gear of each said set being fixed.

18. A steering gear as set forth in claim 1, said steering control drive means comprising a pair of oppositely rotating members, each said member being connected to the sun gear of a respective steering control planetary gear set, a clutch intermediate the carrier of each said set and the respective rotating member and each said carrier being connected to said steering shaft, and a brake for the orbit gear of each of said steering control planetary gear sets.

19. A steering gear as set forth in claim 1, said steering control drive means comprising a bevel gear and a pair of oppositely rotating bevel pinions wherein said operator control means effects power flow connection between said steering control planetary gear sets and a respective bevel pinion, including operator control means to directly and selectively connect said bevel pinions to said steering control shaft for effecting selected direction of rotation thereof at another turning rate.

20. A steering gear as set forth in claim 1, wherein said operator control means comprises friction clutches capable of effecting controlled slipping for the purpose of varying the turning rate.

21. A steering and driving system for a vhecile having a pair of propelling wheels, comprising an input drive member, a pair of summation drive devices having operatively interengaged input, output and control elements establishing continuous propelling power paths from the drive member to the propelling wheels, said input elements being drivingly connected to the drive member, said output elements being drivingly connected to the propelling wheels, reversible steering gear means drivingly connected to the drive member for establishing a steering power path, independent of said propelling power paths, from a driven member to the control elements of the summation drive devices transmitting torque at a plurality of different drive gear ratios, constant mesh gear means in said steering power path drivingly connecting the steering gear means to the control elements for alternate rotation of the control elements in opposite directions during one mode of operation, and control means operatively connected to the steering gear means for selectively holding the control elements stationary and effecting simultaneous rotation thereof in opposite directions to change the turning radius of the vehicle between infinity and a minimum value without interruption of the propelling power path, wherein said steering gear means comprises a steering shaft member interconnected with said constant mesh gear means, a pair of gear sets each having at least three interengaged elements, one of said elements being drivingly connected to one of the drive and steering shaft members, one-way engaging means connected to a second of said elements in at least one of the gear sets for preventing power overlap during said change in turning radius, the third of said elements of the gear sets being connected to the control means.

22. The system as set forth in claim 21 wherein said control means includes clutch means operatively connected to said gear sets for direct drive therethrough when engaged and reduction ratio drive when disengaged, and brake means connected to the steering shaft member for holding the control elements of the summation drive devices stationary.

23. The system as set forth in claim 22 including a plural speed drive mechanism connecting the input drive member to the input elements of the summation drive devices independently of the steering gear means.

24. A steering and driving system for a vehicle having a pair of propelling wheels, comprising an input drive member, a pair of summation drive devices having operatively interengaged input, output and control elements establishing continuous propelling power paths from the drive member to the propelling wheels, said input elements being drivingly connected to the drive member, said output elements being drivingly connected to the propelling wheels, reversible steering gear means drivingly connected to the drive member for establishing a steering power path, independent of said propelling power paths, from the drive member to the control elements of the summation drive devices transmitting torque at a plurality of different drive gear ratios, constant mesh gear means in said steering power path drivingly connecting the steering gear means to the control elements for alternate rotation of the control elements in opposite direction during one mode of operation, and control means operatively connected to the steering gear means for selectively holding the control elements stationary and effecting simultaneous rotation thereof in opposite directions to change the turning radius of the vehicle between infinity and a minimum value without interruption of the propelling power path, including a plural speed drive mechanism connecting the input drive member to the input elements of the summation drive devices independently of the steering gear means.

(References on following page)

References Cited

UNITED STATES PATENTS

| | | | |
|---|---|---|---|
| 2,930,257 | 3/1960 | Christenson | 74—720.5 |
| 2,950,634 | 8/1960 | Clark et al. | 74—720.5 |
| 3,075,408 | 1/1963 | Chapman et al. | 74—720.5 |
| 3,107,554 | 10/1963 | Polah et al. | 74—720.5 |
| 3,292,458 | 12/1966 | Livezey | 74—720.5 |
| 3,294,187 | 12/1966 | Ruf | 74—720.5 |
| 3,199,376 | 8/1965 | De Lalio | 74—720.5 |
| 3,373,636 | 3/1968 | Livezey et al. | 74—720.5 |
| 3,377,885 | 4/1968 | Tuck et al. | 74—720.5 |

FOREIGN PATENTS

| | | |
|---|---|---|
| 272,736 | 4/1951 | Switzerland. |
| 1,154,724 | 9/1963 | Germany. |
| 1,176,002 | 8/1964 | Germany. |

DONLEY J. STOCKING, *Primary Examiner.*

THOMAS C. PERRY, *Assistant Examiner.*

U.S. Cl. X.R.

180—6.7